US010795175B2

(12) United States Patent
Taguchi

(10) Patent No.: US 10,795,175 B2
(45) Date of Patent: Oct. 6, 2020

(54) IMAGING LENS AND IMAGING DEVICE

(71) Applicant: CANON KABUSHIKI KAISHA, Tokyo (JP)

(72) Inventor: Takayuki Taguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/538,857

(22) Filed: Aug. 13, 2019

(65) Prior Publication Data

US 2019/0361263 A1 Nov. 28, 2019

Related U.S. Application Data

(63) Continuation of application No. 15/830,126, filed on Dec. 4, 2017, now Pat. No. 10,423,006.

(30) Foreign Application Priority Data

Dec. 14, 2016 (JP) ................. 2016-241955

(51) Int. Cl.
G02B 27/64 (2006.01)
H01F 7/06 (2006.01)
H04N 5/225 (2006.01)
H04N 5/232 (2006.01)
G03B 5/00 (2006.01)
H01F 27/36 (2006.01)

(52) U.S. Cl.
CPC ............ *G02B 27/646* (2013.01); *G03B 5/00* (2013.01); *H01F 7/064* (2013.01); *H01F 27/362* (2013.01); *H04N 5/2253* (2013.01); *H04N 5/2254* (2013.01); *H04N 5/23287* (2013.01); *G03B 2205/0015* (2013.01); *G03B 2205/0069* (2013.01); *H01F 7/06* (2013.01)

(58) Field of Classification Search
None
See application file for complete search history.

(56) References Cited

U.S. PATENT DOCUMENTS

| 9,568,743 B2 | 2/2017 | Hayashi |
| 10,423,006 B2 * | 9/2019 | Taguchi ............... H04N 5/2253 |
| 2011/0097062 A1 | 4/2011 | Tsuruta et al. |
| 2011/0286732 A1 | 11/2011 | Hosokawa et al. |
| 2016/0006958 A1 | 1/2016 | Iwamatsu |
| 2016/0178923 A1 | 6/2016 | Hayashi |

FOREIGN PATENT DOCUMENTS

JP 2015-034912 A 2/2015

* cited by examiner

*Primary Examiner* — William B Perkey
(74) *Attorney, Agent, or Firm* — Venable LLP

(57) ABSTRACT

According to one aspect of the present invention, there is provided an imaging lens including: an image shake correcting action unit provided movably in a direction perpendicular to an optical axis of the lens; a stationary unit for supporting the image shake correcting action unit; a permanent magnet provided on one of the image shake correcting action unit and the stationary unit and a coil provided on an other; a drive circuit for moving the image shake correcting action unit relative to the stationary unit; a mount section for being connected to an imaging unit; and a conductive member which is nonmagnetically conductive and disposed between the coil and the mount section so as to include a facing surface facing a surface formed by a winding wire of the coil and having a larger area than a surface formed by an inner periphery of the coil.

13 Claims, 11 Drawing Sheets

IMAGING LENS AND IMAGING DEVICE

This application is a continuation of application Ser. No. 15/830,126 filed Dec. 4, 2017.

BACKGROUND OF THE INVENTION

Field of the Invention

The present invention relates to a technique for reducing magnetic noise generated by a coil of an image shake correction device.

Description of the Related Art

Various imaging devices have been proposed each having an image shake correction mechanism for reducing an image blur on an image formation surface caused by a camera shake when capturing still images or moving images. In particular, the optical image shake correction mechanism can be considered to have a highly effective camera shake correction effect. A general optical image shake correction mechanism detects shaking of the optical axis caused by the camera shake or the like by means of a vibration gyroscope sensor, etc., and moves an image shake correcting action unit such as a correction lens in the imaging lens so as to cancel the detected shaking of the optical axis. In order to move the image shake correcting action unit, electromagnetic force generated by supplying a current to a coil arranged opposite to a permanent magnet is used.

However, when a current flows through the coil of the image shake correction device, a magnetic field is generated. This magnetic field leaks to an imaging element such as a CMOS image sensor or its surrounding circuit mounted on an imaging device and is superimposed on an image signal as magnetic noise to deteriorate the image quality. As a method for suppressing the magnetic noise generated by a coil of the image shake correction device, for example, Japanese Patent Application Laid-Open No. 2015-34912 proposes a configuration in which an electromagnetic wave shielding member is disposed on an imaging element side of a flexible printed board that supplies a current to the coil.

In order to cover the camera shake correction coil with the electromagnetic shielding member, it is necessary to secure the path of light from an object passing through the imaging optical system while maintaining the camera shake correction function. Therefore, it is difficult to completely cover the camera shake correction coil with the electromagnetic shielding member, and even when the electromagnetic shielding member described in Japanese Patent Application Laid-Open No. 2015-34912 is used, the leakage of the magnetic field generated by the coil of the image shake correction device cannot be sufficiently prevented. In particular, when a highly sensitive imaging element is used, there has been a problem that the influence of noise due to the leakage of the magnetic field cannot be ignored.

SUMMARY OF THE INVENTION

According to one aspect of the present invention, there is provided an imaging lens including: a lens; an image shake correcting action unit provided movably in a direction perpendicular to an optical axis of the lens; a stationary unit for supporting the image shake correcting action unit; a permanent magnet provided on one of the image shake correcting action unit and the stationary unit and a coil provided on an other; a drive circuit for moving the image shake correcting action unit relative to the stationary unit; a mount section for being connected to an imaging unit having an imaging element; and a conductive member which is nonmagnetically conductive and disposed between the coil and the mount section so as to include a facing surface facing a surface formed by a winding wire of the coil and having a larger area than a surface formed by an inner periphery of the coil.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
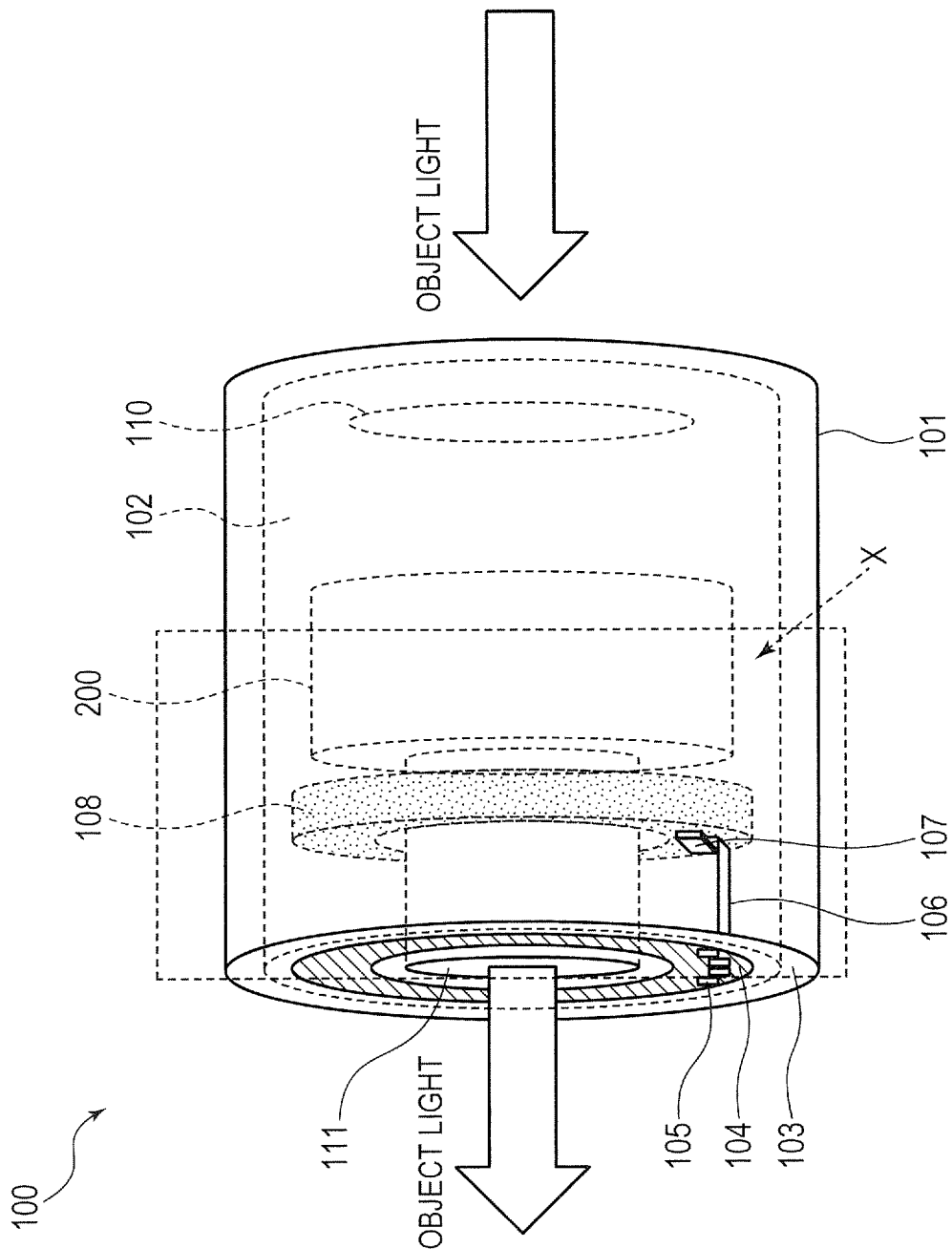
FIG. 1 is a schematic view showing a configuration of an imaging lens provided with an image shake correction device according to a first embodiment.

First, with reference to FIGS. 1 to 4B, the configuration of the imaging lens and the imaging device according to a first embodiment will be described. FIG. 1 is a schematic view showing a configuration of an imaging lens 100 provided with an image shake correction device according to the first embodiment. The imaging lens 100 shown in FIG. 1 is applied to, for example, an imaging device such as a still camera or a video camera. Alternatively, the lens may be applied to an interchangeable lens used with an imaging device. The image shake correction device of the present embodiment is configured by being provided with at least an image shake correction mechanism 200 shown in FIG. 1.

Figure 2:
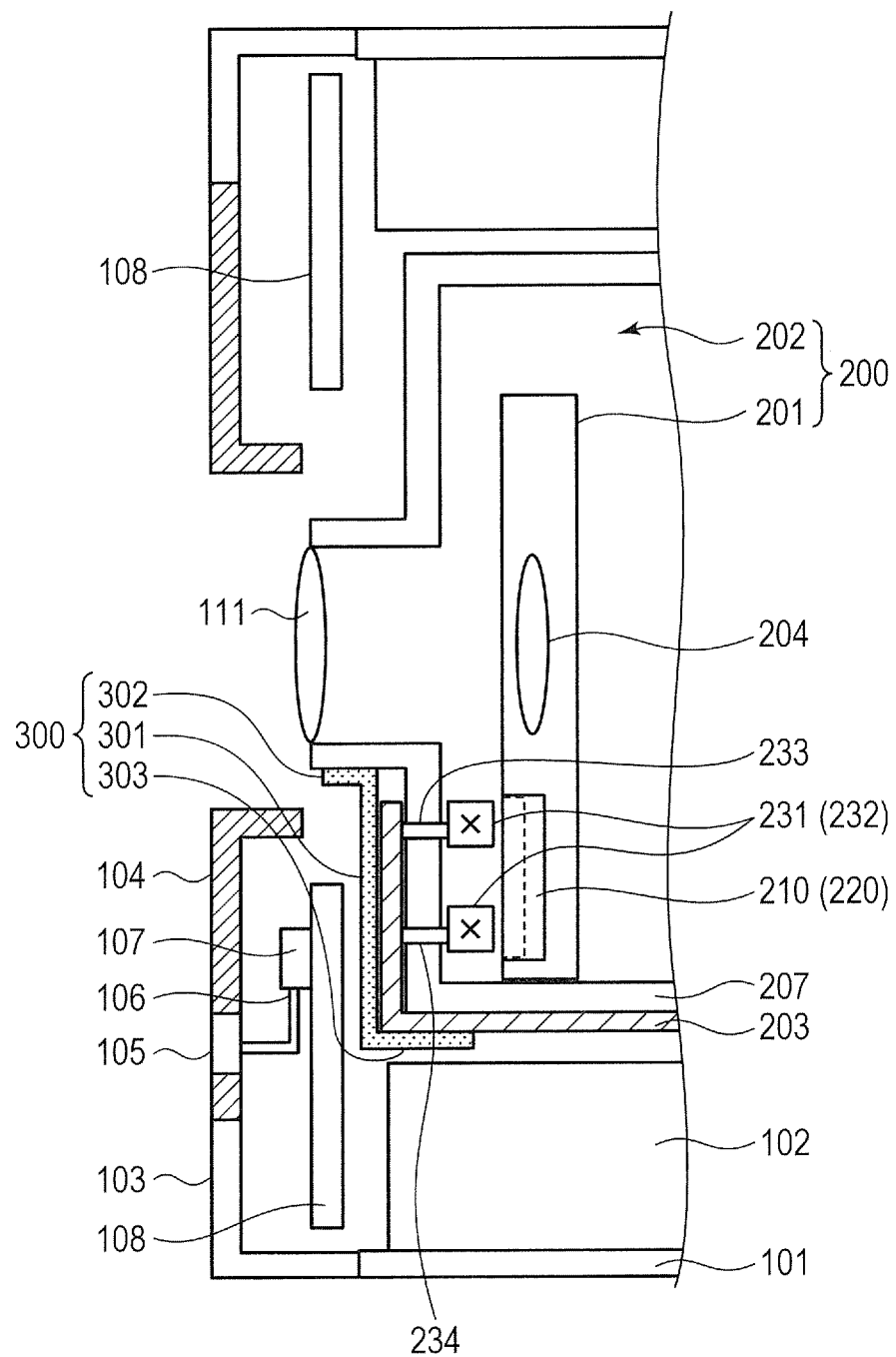
FIG. 2 is a schematic view showing a configuration of an image shake correction mechanism according to the first embodiment.
Figure 3A:
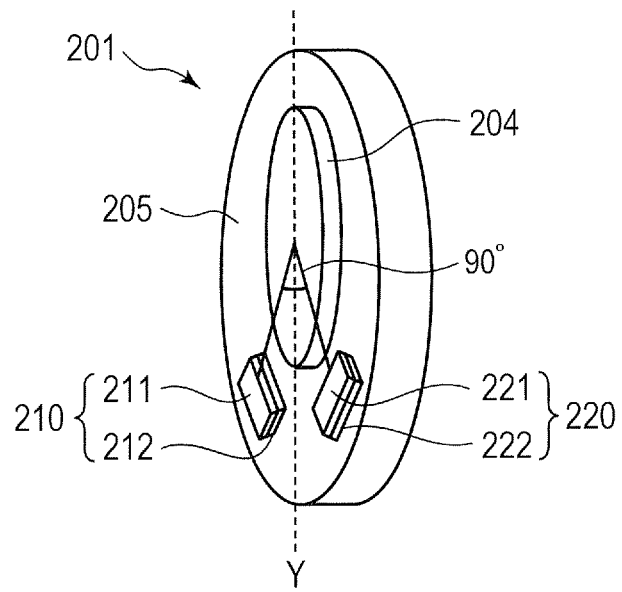
FIGS. 3A and 3B are schematic views showing the configurations of a correcting action unit and a stationary unit in the image shake correction mechanism according to the first embodiment.
Figure 3B:
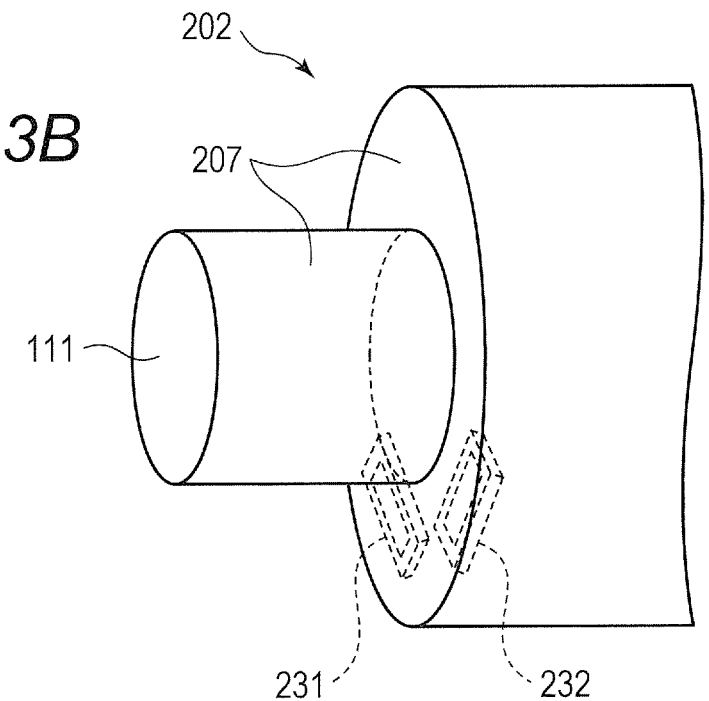
Figure 4A:
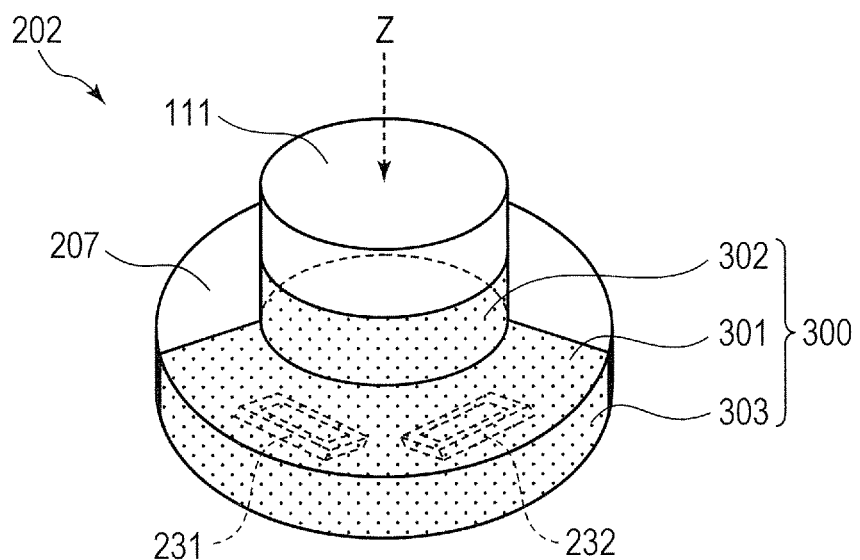
FIGS. 4A and 4B are schematic views showing the configuration of a conductive member in the image shake correction mechanism according to the first embodiment together with the stationary unit.
Figure 4B:
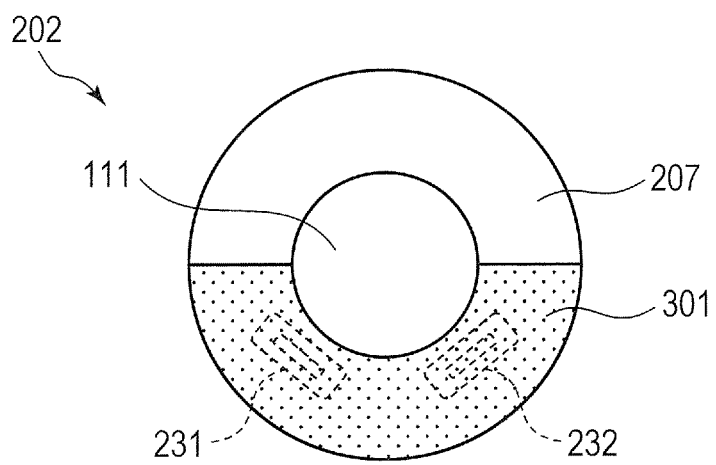

FIG. 2 is a schematic view showing the configuration of the image shake correction mechanism 200 according to the first embodiment. FIG. 2 is a cross-sectional view schematically showing the area enclosed by the broken lines forming a rectangle on the imaging lens 100 shown in FIG. 1 when viewed in the direction X. FIGS. 3A and 3B are schematic views showing the configuration of a correcting action unit 201 and a stationary unit 202 in the image shake correction mechanism 200 according to the first embodiment. FIG. 3A is a perspective view schematically showing the correcting action unit 201 shown in FIG. 2. FIG. 3B is a perspective view schematically showing the stationary unit 202 shown in FIG. 2. Further, FIGS. 4A and 4B are schematic views showing the configuration of a conductive member 300 in the image shake correction mechanism 200 according to the first embodiment together with the stationary unit 202. FIG. 4A is a perspective view schematically showing the conductive member 300 provided on the stationary unit 202. Moreover, FIG. 4B is a plan view of the stationary unit 202 and the conductive member 300 shown in FIG. 4A when viewed in the direction Z.

The imaging lens 100 shown in FIG. 1 includes a lens 110 for taking in light from an object (hereinafter referred to as "object light"), a lens 111 for guiding the object light to an imaging element provided in an imaging unit (not shown) constituting an imaging device by connecting the imaging lens 100 to the unit. Further, there is provided a lens outer casing 101 having a substantially circular shape and an inner casing 102 made of resin. The inner casing 102 has a mount section that is connected and supported by screws (not shown) and is used for mechanical and electrical connection with the imaging unit. The mount section has a metal mount 103 and a resin mount 104. The resin mount 104 having an opening through which the object light passes is connected to the metal mount 103, and is adjacent to the lens 111. The resin mount 104 has a signal wiring portion 105 for transmitting a signal to the imaging device. The signal wiring portion 105 is connected to a printed circuit board 108 disposed inside the imaging lens 100 via a flexible printed board 106 and a connector 107. The printed circuit board 108 is supported by the inner casing 102, and has an opening through which the object light passes, having a substantially circular shape. The printed circuit board 108 is connected to the flexible printed board 106 via the connector 107.

The imaging lens 100 has the optical image shake correction mechanism 200 inside. As shown in FIG. 2, the image shake correction mechanism 200 includes the correcting action unit 201 for correcting a deviation of the object light, the stationary unit 202, a flexible printed board 203 provided on the stationary unit 202, and the nonmagnetic conductive member 300. The image shake correction mechanism 200 is supported by the inner casing 102 and corrects the deviation of the optical axis of the object light guided to the imaging element (not shown).

The stationary unit 202 has an optical system (lens 111) for collecting the object light to an imaging element provided in an imaging unit (not shown). On the other hand, the correcting action unit 201 has a correction lens 204 for correcting a deviation of the optical axis of the optical system (lens 111), that is, the optical axis of the object light, and is disposed on the optical axis of the object light so as to be movable in a direction perpendicular to the optical axis. Magnet units 210 and 220 are provided on one of the correcting action unit 201 and the stationary unit 202, and coils 231 and 232 are provided on the other. For example, in FIG. 2, the magnet units 210 and 220 are provided in the correcting action unit 201, and the coils 231 and 232 are provided in the stationary unit 202. A drive circuit (not shown) mounted on the flexible printed board 203 supplies a current to the coils 231 and 232 and moves the correcting action unit 201 relative to the stationary unit 202 by using an electromagnetic force acting between the coils 231 and 232 and the magnet units 210 and 220. With such a configuration, the correcting action unit 201 is moved so as to cancel out the camera shake, thereby correcting the optical axis deviation of the object light and enabling zooming of the object.

As shown in FIG. 3A, the correcting action unit 201 has the correction lens 204, the magnet units 210 and 220, and a correcting-action-unit support 205. The correcting-action-unit support 205 sustains the correction lens 204 and the magnet units 210 and 220. The magnet unit 210 has a substantially rectangular parallelepiped shape and is formed, for example, by bonding a permanent magnet 211 and a yoke 212 to each other integrally. Similarly, the magnet unit 220 is also formed in a substantially rectangular parallelepiped shape, and is formed, for example, by bonding a permanent magnet 221 and a yoke 222 to each other integrally.

When the imaging device is held in the normal position, the magnet units 210 and 220 are located below the center of the correction lens 204, and symmetrically arranged in the horizontal direction with respect to a vertical line Y extending from top to bottom to pass through the center of the correction lens 204. As shown in FIG. 3A, the center of the correction lens 204, the center of the magnet unit 210, and the center of the magnet unit 220 are arranged so as to form a 90 degree angle on the plane perpendicular to the optical axis of the object light.

As shown in FIG. 3B, the stationary unit 202 has the coils 231 and 232, the lens 111, and a support 207. The support 207 sustains the coils 231 and 232 and the lens 111, and serves as an outer casing of the image shake correction mechanism 200. Further, as shown in FIG. 2, the coil 231 is provided with terminals 233 and 234 passing through the support 207. The same goes for the coil 232. The terminals 233 and 234 are electrically connected to the flexible printed board 203 extending along the support 207 to the vicinity of the coils 231 and 232. Also, the flexible printed board 203 is electrically connected to the printed circuit board 108.

The correcting-action-unit support 205 and the support 207 are connected to each other by spring or the like (not shown) and are supported by elastic force of the spring. In this case, the coil 231 is provided so as to be close to the magnet unit 210 without contact therewith and so that the surface formed by winding wire of the coil 231 (hereinafter, referred to as a "coil surface") and the surface of the magnet unit 210 are arranged to face each other. Similarly, the coil 232 is provided so as to be close to the magnet unit 220 without contact therewith and so that the coil surface formed by winding wire of the coil 232 and the surface of the magnet unit 220 are arranged to face each other.

As shown in FIG. 4A, the nonmagnetic conductive member 300 has a facing surface 301 facing the coil surface formed by the winding wires of the coils 231 and 232, and bent portions 302 and 303 provided at edges of the facing surface 301. The facing surface 301 has a larger surface than the coils 231 and 232. The conductive member 300 is arranged so as to be positioned between the coils 231 and 232 and the imaging element when the imaging lens is connected with the imaging unit and used as an imaging device. That is, the conductive member 300 is disposed between the coils 231 and 232 and the mount section. For example, the conductive member 300 shown in FIG. 2 is arranged on the imaging element side (left side in FIG. 2) of the flexible printed board 203. The drive circuit (not shown) that supplies current to the coils 231 and 232 may be configured to be mounted on a member other than the flexible printed board 203 and to supply the current required for driving through the flexible printed board 203.

The bent portions 302 and 303 are provided along the support 207 as shown in FIG. 4A. To be more specific, the bent portion 302 is bent in a direction away from the coils 231 and 232 (toward the lens 111). The length of the bent portion 302 is set so as not to interfere with the object light passing through the lens 111, and therefore, the captured image is not affected. On the other hand, the bent portion 303 is bent in a direction toward the coils 231 and 232 (direction away from the lens 111), and is provided between the support 207 and the inner casing 102. In this case, a space is provided between the inner casing 102 and the bent portion 303 so as not to prevent the image shake correction mechanism 200 from moving in the direction parallel to the object light.

In this case, although it has been mentioned that a space is provided between the bent portion 303 and the inner casing 102, if the configuration is made so as not to hinder the movement of the image shake correction mechanism 200, a configuration in which the bent portion 303 and the inner casing 102 are in contact with each other or a configuration in which another member is inserted therebetween can be employed. In FIG. 2, the facing surface 301 is disposed on the imaging element side (left side in FIG. 2) of the coils 231 and 232 and the flexible printed board 203. However, as long as the flexible printed board 203 and the coils 231 and 232 can be kept connected with each other, the flexible printed board 203 may be arranged on the lens 111 side of the facing surface 301. In addition, it has been mentioned that the facing surface 301 has a larger surface than the coils 231 and 232, but not limited thereto, and the facing surface 301 has only to have at least an area larger than the area formed by the inner peripheries of the coils 231 and 232.

In FIG. 2, although the bent portions 302 and 303 are provided along the support 207, the bent portions 302 and 303 have only to be provided outside the positions opposed to the inner peripheries of the coils 231 and 232. In the present embodiment, the two bent portions 302 and 303 are provided, but more bent portions 302 and 303 may be provided in conformity with the shape of the coils 231 and 232 and the shape of the facing surface 301.

In addition, the imaging lens 100 according to the present embodiment may also include a lens, which is necessary for adjusting the focal distance, or the like. In the imaging lens 100 according to the present embodiment, the magnet units 210 and 220 are provided in the correcting action unit 201 and the coils 231 and 232 are provided in the stationary unit 202, but not limited thereto, and the configuration only need to move the correcting action unit 201 with respect to the stationary unit 202 relatively. It is also possible to provide the correcting action unit 201 with the coils 231 and 232, and the stationary unit 202 with the magnet units 210 and 220.

Figure 5A:
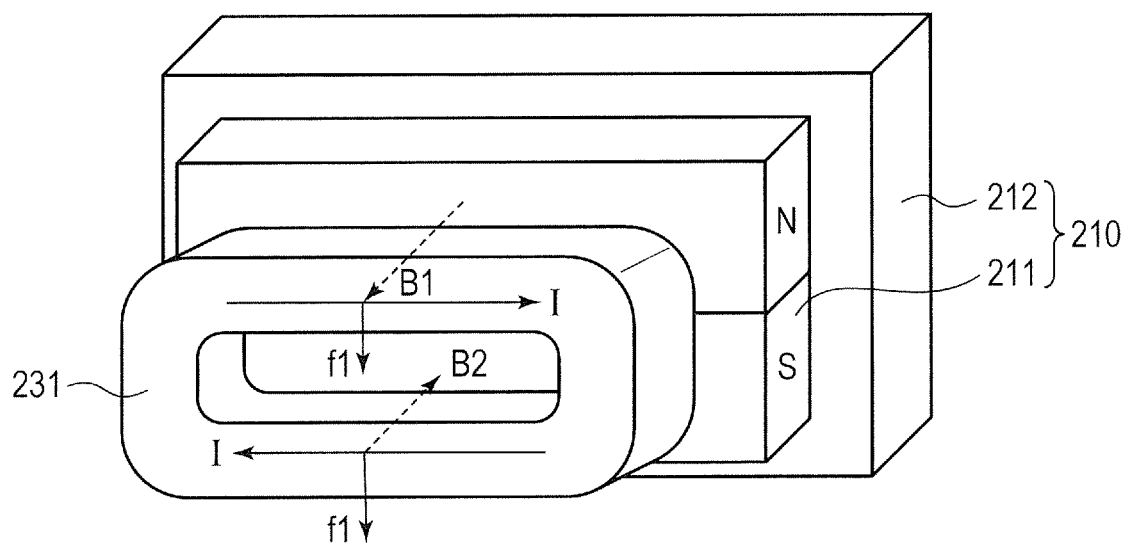
FIGS. 5A and 5B are diagrams for illustrating the operation principle of the image shake correction mechanism according to the first embodiment.
Figure 5B:
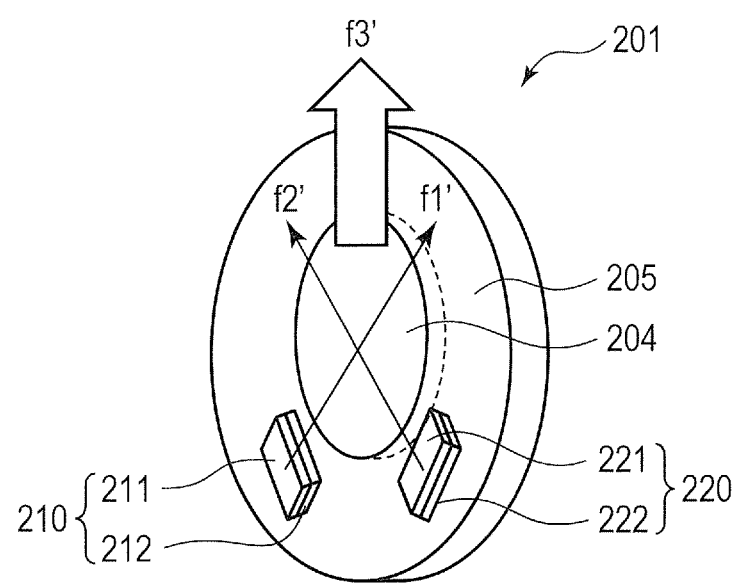

Next, the operation of the image shake correction device according to the first embodiment will be more specifically described with reference to FIGS. 5A and 5B. The image shake correction device according to the present embodiment detects the shaking of the optical axis due to camera shaking or the like by means of a gyroscope sensor or the like and moves the correction lens 204 of the image shake correcting action unit 201 so that the detected shaking of the optical axis is canceled, and corrects the deviation of the optical axis of the object light. FIGS. 5A and 5B are diagrams for illustrating the operation principle of the image shake correction mechanism 200 according to the first embodiment.

As shown in FIG. 5B, the correcting action unit 201 has the correction lens 204 for correcting the optical axis deviation of the object light, and is provided so as to be movable in a direction perpendicular to the optical axis. In order to move the correcting action unit 201, the electromagnetic force generated by supplying a current to the coils 231 and 232 arranged opposite to the permanent magnets 211 and 221 is utilized. As shown in FIG. 5A, the image shake correction mechanism 200 has the coil 231 wound in a substantially rectangular shape and facing the permanent magnet 211 of the magnet unit 210.

Thus, as shown in FIG. 5A, when a current I flows through the coil 231 in a state where a magnetic field B1 directed from the permanent magnet 211 to the coil 231, or a magnetic field B2 directed from the coil 231 to the permanent magnet 211 is present, an electromagnetic force f1 is applied to the coil 231. In this case, since the coil 231 is provided on the stationary unit 202, in practice, an electromagnetic force f1' in the direction opposite to the electromagnetic force f1 is applied to the magnet unit 210 provided in the correcting action unit 201. Similarly, as for the magnet unit 220, when a current flows to the coil 232 in a state where a magnetic field directed from the permanent magnet 221 to the coil 232 or a magnetic field directed from the coil 232 to the permanent magnet 221 is present, an electromagnetic force f2' will be applied to the magnet unit 220.

As described above, the image shake correction mechanism 200 of the present embodiment has the two magnet units 210 and 220 and the two coils 231 and 232. The correcting action unit 201 is moved relative to the stationary unit 202 by resultant force f3' of the electromagnetic force f1' generated between the magnet unit 210 and the coil 231 and the electromagnetic force f2' generated between the magnet unit 220 and the coil 232. Thus, in order to apply the resultant force f3' in various directions perpendicular to the optical axis of the object light, the magnitude and the phase relationship of the current flowing through the coils 231 and 232 are changed. In the present embodiment, the magnet units 210 and 220 are symmetrically arranged in the horizontal direction with respect to the vertical line Y as shown in FIG. 3A. Accordingly, when currents of the same magnitude and the same phase flow in the coils 231 and 232, as shown in FIG. 5B, the electromagnetic force applied in the horizontal direction as the resultant force of the electromagnetic force f1' and the electromagnetic force f2' is canceled and the upward resultant force f3' in FIG. 5B is generated. As a result, the image shake correcting action unit 201 moves in a direction perpendicular to the optical axis of the object light.

As described above, the correcting-action-unit support 205 and the support 207 are connected by a spring or the like (not shown), and are supported by the elastic force of the spring. Therefore, the drive of the correcting action unit 201 is performed by the resultant force of the weight of the correcting action unit 201, the elastic force of a spring or the like (not shown) and the electromagnetic force generated by the current flowing through the coils 231 and 232.

In the image shake correction mechanism 200 of the present embodiment, the two magnet units 210 and 220 and the two coils 231 and 232 are provided, but the number thereof is not limited to this, and since a necessary number of pieces only have to be prepared for driving the correcting action unit 201, the configuration may have more number of the magnet units and coils.

In addition, the magnet units 210 and 220 and the coils 231 and 232 are disposed below the center of the correction lens 204 in FIG. 5B, but may be disposed above the center of the correction lens 204. As long as the correcting action unit 201 can be driven in any direction by the resultant force of the electromagnetic force and the elastic force of the spring or the like and the weight of the correcting action unit 201, the magnet units 210 and 220 and coils 231 and 232 may be disposed above the center of the correction lens 204.

Although the correcting-action-unit support 205 and the support 207 are connected to each other by a spring or the like (not shown), the supports only have to support the correcting action unit 201, and thus for example, a configuration using electromagnetic force such as force used for driving the correcting action unit 201 or other mechanical mechanisms such as springs may be employed.

Figure 6:
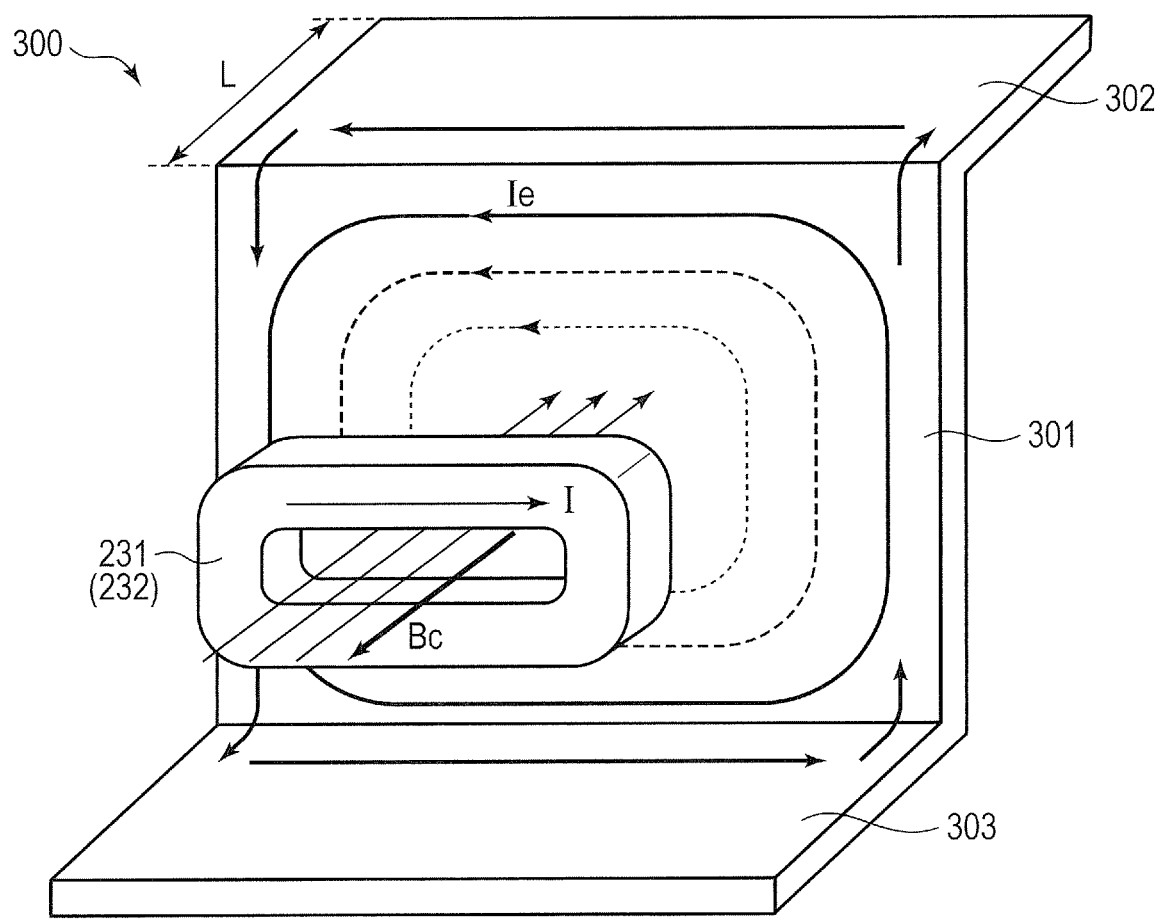
FIG. 6 is a diagram for illustrating a reduction effect of a magnetic noise, caused by a conductive member in the image shake correction mechanism according to the first embodiment.

Next, referring to FIG. 6, a method of reducing magnetic noise generated by the coils 231 and 232 of the image shake correction device according to the first embodiment will be described. The image shake correction device of the present embodiment uses the nonmagnetic conductive member 300 to reduce the magnetic noise generated by the coils 231 and 232 of the image shake correction mechanism 200. FIG. 6 is a diagram for illustrating a reduction effect of the conductive member 300 on the magnetic noise in the image shake correction mechanism 200 according to the first embodiment.

As described above, when a current I flows through the coils 231 and 232 of the image shake correction mechanism 200 to correct the deviation of the optical axis of the object light, a magnetic field is generated from the coils 231 and 232. As shown in FIG. 6, the generated magnetic field is interlinked with the facing surface 301 of the conductive member 300, and an eddy current Ie flows in the facing surface 301 in a direction so as to generate a magnetic field Bc for canceling the interlinked magnetic field. Thus, by providing the conductive member 300, the generation of a magnetic field interlinked with the conductive member 300 is suppressed, and the magnetic field reaching the imaging element is reduced.

In this case, the eddy current Ie flowing in the facing surface 301 becomes a vortex-state current enclosed in the conductive member 300, and more current flows outside the positions of the conductive member 300 opposed to the inner peripheries of the coils 231 and 232. That is to say, the eddy current flows most at the edge of the facing surface 301. Hence, the facing surface 301 is configured to have at least a larger area than the area formed by the inner peripheries of the coils 231 and 232.

The conductive member 300 is provided with the bent portions 302 and 303 outside the positions of the conductive member 300 opposed to the inner peripheries of the coils 231 and 232. Due to the presence of the bent portions 302 and 303, the edge of the facing surface 301 where the eddy current flows most becomes thicker. As a result, since the thickness of the edge of the facing surface 301 increases, the resistance value at the edge of the facing surface 301 lowers. In addition, a sufficient thickness can be provided also for the skin depth corresponding to the frequency of the eddy current. Thus, by providing the bent portions 302 and 303, more eddy currents flow to generate the magnetic field Bc shown in FIG. 6 more so that the magnetic field interlinked with the facing surface 301 can be canceled.

As described above, in the image shake correction mechanism 200 of the present embodiment, the magnetic noise generated by the coils 231 and 232 of the image shake correction mechanism 200 is reduced by eddy currents flowing through the conductive member 300. Thus, it is preferable that many of the magnetic fields generated by the coils 231 and 232 are interlinked with the facing surface 301.

The component of the magnetic field on the winding axis in the winding axis direction generated by the coils 231 and 232 becomes smaller as the position in the component becomes farther away from the coil surface formed by the wire wound in the coils 231 and 232. Here, the winding axis means the central axis when the wires of the coils 231 and 232 are wound. It is theoretically known that, for example, the component of the magnetic field on the winding axis in the winding axis direction located at a distance corresponding to the radius of the outer peripheries of the coils 231 and 232 from the coil surface is equal to about ½ of the component of the magnetic field on the winding axis in the winding axis direction located on the coil surface. Therefore, it is preferable that the distance from the coil surfaces of the coils 231 and 232 to the facing surface 301 of the conductive member 300 is smaller (shorter) than the maximum radius of the outer peripheries of the coils 231 and 232. Here, the maximum radius of the outer peripheries of the coils 231 and 232 means the greatest (longest) length from the center to the outer periphery of the coil surface of each of the coils 231 and 232.

In addition, in the image shake correction mechanism 200 of the present embodiment, the bent portions 302 and 303 are provided to increase the thickness of the edge of the facing surface 301 and reduce the resistance value. Thus, a larger amount of eddy current is supplied to reduce the magnetic field interlinked with the facing surface 301. Accordingly, it is preferable that the length L of the bent portions 302 and 303 from the edge of the facing surface 301 shown in FIG. 6 is greater (longer).

The eddy current flowing in the facing surface 301 has a distribution in which a current flows more where the linking with the coils 231 and 232 is stronger around positions at which the facing surface 301 intersects with the winding axes of the coils 231 and 232. Thus, most of the eddy currents will flow through the facing surface 301 with a width corresponding to the radius of the outer peripheries of the coils 231 and 232. By increasing the thickness of the facing surface 301 to reduce the resistance value, the bent portions 302 and 303 increase the eddy current and reduce the magnetic field interlinked with the facing surface 301.

Hence, in the conductive member 300 of the present embodiment, the length L of the bent portions 302 and 303 is made greater than the minimum radius of the outer peripheries of the coils 231 and 232. Here, the minimum radius of the outer peripheries of the coils 231 and 232 is the smallest (shortest) length from the center to the outer periphery of the coil surface of the coils 231 and 232. As a result, when the thickness of the bent portions 302 and 303 and the thickness of the facing surface 301 are approximately equal to each other, the resistance value of the bent portions 302 and 303 can be made smaller (lower) than the resistance value of the eddy current path of the facing surface 301.

As shown in FIG. 6, although it is preferable that the bent portions 302 and 303 are bent perpendicularly to the facing surface 301, as long as the bent portions 302 and 303 have an angle with respect to the facing surface 301, the resistance at the edge of the conductive member 300 is reduced. In FIG. 6, although the conductive member 300 having the facing surface 301 facing the coils 231 and 232 is composed of one member, a plurality of members may be provided for the coils 231 and 232, for example, two for the coils 231 and 232 respectively. Moreover, most of the eddy current flowing in the facing surface 301 flows on the edge, and therefore, the configuration may have an opening or the like. Further, the conductive member 300 is made of a nonmagnetic material, but may be a metal containing a magnetic permeability that does not cause problems in the generation of eddy currents and in the operation of the image shake correction mechanism 200, and SUS304 or the like may be used other than copper, aluminum and the like.

As described above, in the conductive member 300 of the present embodiment, the magnetic field generated in the coils 231 and 232 of the image shake correction mechanism 200 and interlinked with the facing surface 301 is canceled by applying a lot of eddy current to the edge including the bent portions 302 and 303. This can reduce the magnetic field reaching the imaging element and suppress the occurrence of image disturbance by the simple structure of the bent portions 302 and 303. The magnetic noise can be reduced by only adding the conductive member 300 having the bent portions 302 and 303 to the existing structure. As a result, it is not necessary to increase the size of the members in order to reduce the magnetic noise, and thus, the magnetic noise can be reduced while the space saving and lightening of the product are dealt with. In addition, the magnetic noise can be reduced without affecting the object light reaching the imaging element, the mechanism for zooming, and the like.

Although an imaging device allowing the removal of the imaging lens from the imaging unit has been described, the present invention can be applied to an imaging device in which the imaging lens and the imaging unit are integrated, and the same effect can be obtained.

Example 1

Figure 7:
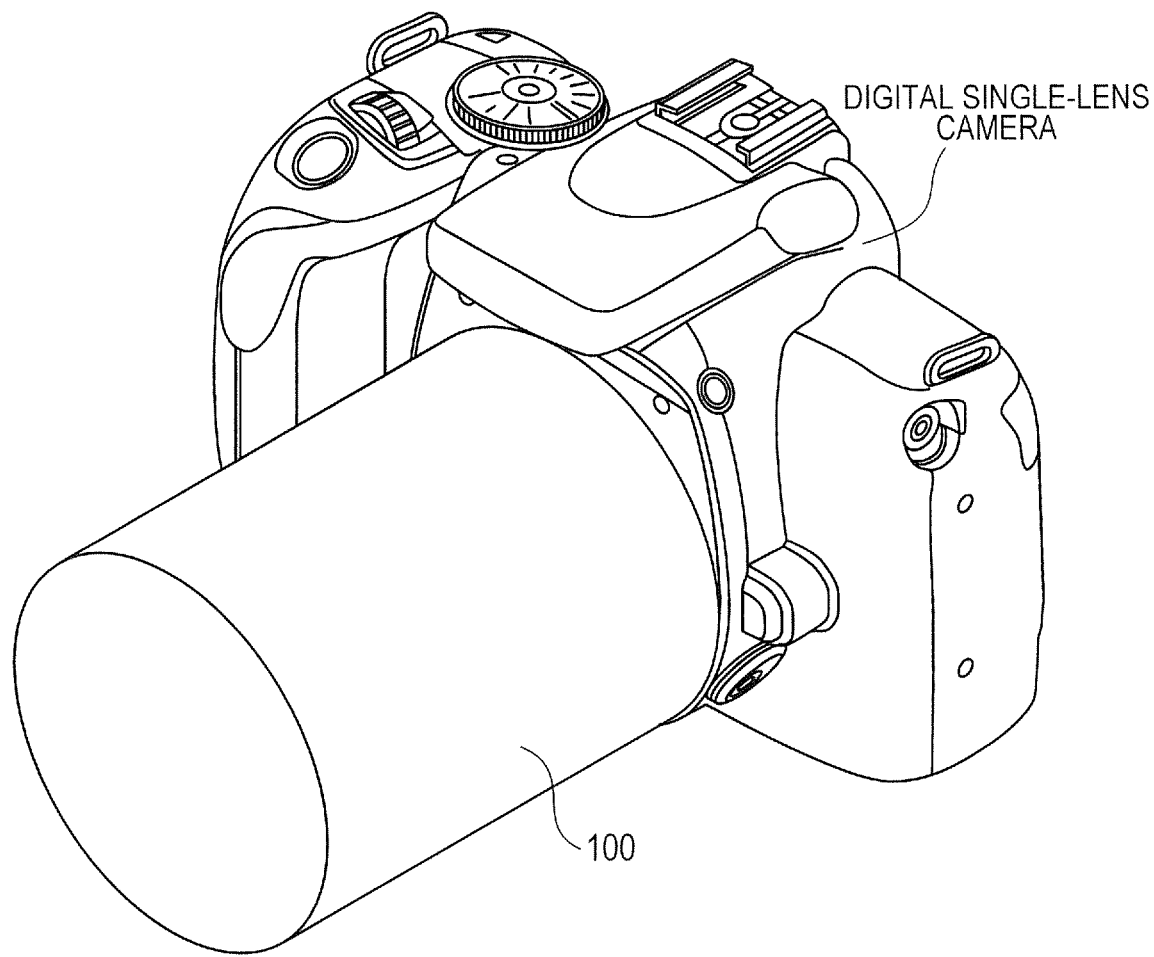
FIG. 7 is a schematic view showing an imaging device used in Example 1 and Comparative Example 1 in a comparative examination of the image shake correction mechanism according to the first embodiment.

In order to confirm the effect of the conductive member 300 of the present embodiment for reducing the magnetic noise, comparative examination between the present embodiment and the conventional configuration was made based on actual measurement. As Example 1 in the comparative examination, the conductive member 300 shown in FIG. 6 was used. As Comparative Example 1 against Example 1, a member in which the bent portions 302 and 303 were removed from the conductive member 300 shown in FIG. 6 was used. FIG. 7 is a schematic view showing an imaging device used for Example 1 and Comparative Example 1 in a comparative examination of the image shake correction mechanism 200 according to the first embodiment. As an examination method, the imaging lens 100 having the image shake correction mechanism 200 according to Example 1 or Comparative Example 1 was attached to a digital single-lens camera (imaging unit) as shown in FIG. 7, and a dark image was captured, and then the disturbance of the image observed in the dark image was measured and examined. Hereinafter, the measurement results will be described.

Figure 8A:
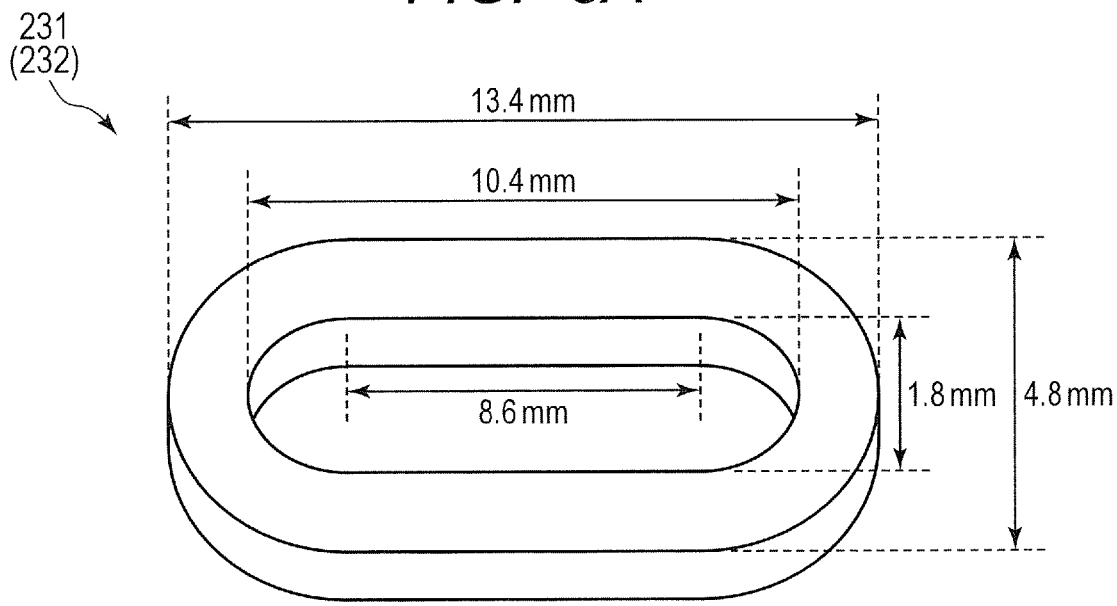
FIGS. 8A and 8B are schematic views showing a coil and a magnet unit used in Example 1 in the comparative examination of the image shake correction mechanism according to the first embodiment.
Figure 8B:
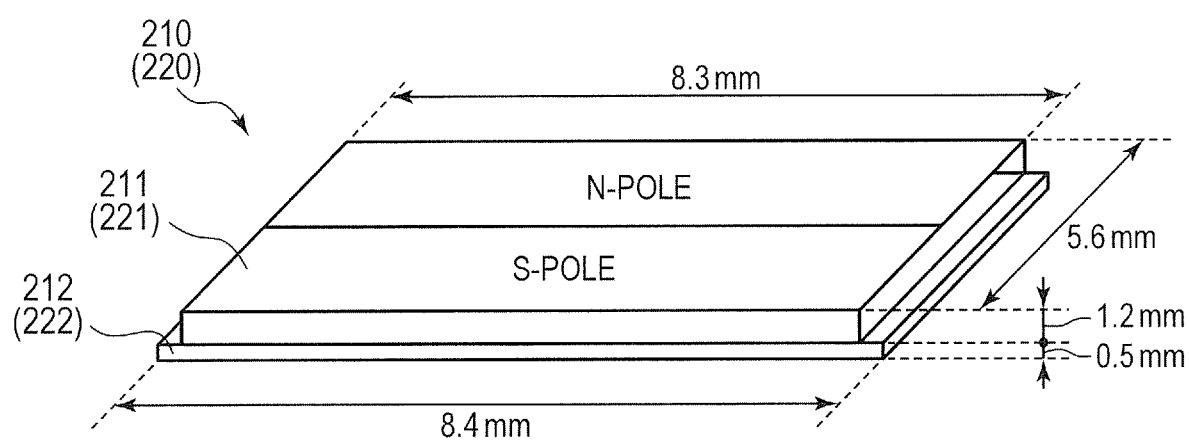

FIGS. 8A and 8B are schematic views showing the coils 231 and 232 and the magnet units 210 and 220 used for Example 1 in the comparative examination of the image shake correction mechanism 200 according to the first embodiment. As shown in FIG. 8A, the inner circumferential length of the coils 231 and 232 is 1.8π+17.2 [mm], and the outer circumferential length is 4.8π+17.2 [mm]. The length 17.2 [mm] in the inner circumferential length is the length of the straight portions parallel to each other at a distance of 1.8 [mm] each having a length of 8.6 [mm], and the length 1.8π [mm] is the length of the semicircular parts with a diameter of 1.8 [mm] located at both ends. The length 17.2 [mm] in the outer circumferential length is the length of the straight portions parallel to each other at a distance of 4.8 [mm] each having a length of 8.6 [mm], and the length 4.8π [mm] is the length of the semicircular parts with a diameter of 4.8 [mm] located at both ends.

As shown in FIG. 8B, each of the permanent magnets 211 and 221 of the magnet units 210 and 220 has a substantially rectangular parallelepiped shape having a width of 5.6 [mm], a length of 8.3 [mm], and a thickness of 1.2 [mm], and both ends in the width direction are configured to be the N-pole and the S-pole of the magnet. The surfaces of the permanent magnets 211 and 221 are arranged so as to face the coil surface made by each winding wire of the coils 231 and 232 at a distance of 0.3 [mm] from the coil surface. The yokes 212 and 222 attached to the permanent magnets 211 and 221 respectively are formed in a substantially rectangular parallelepiped shape having a width of 5.6 [mm], a length of 8.4 [mm] and a thickness of 0.5 [mm].

Figure 9:
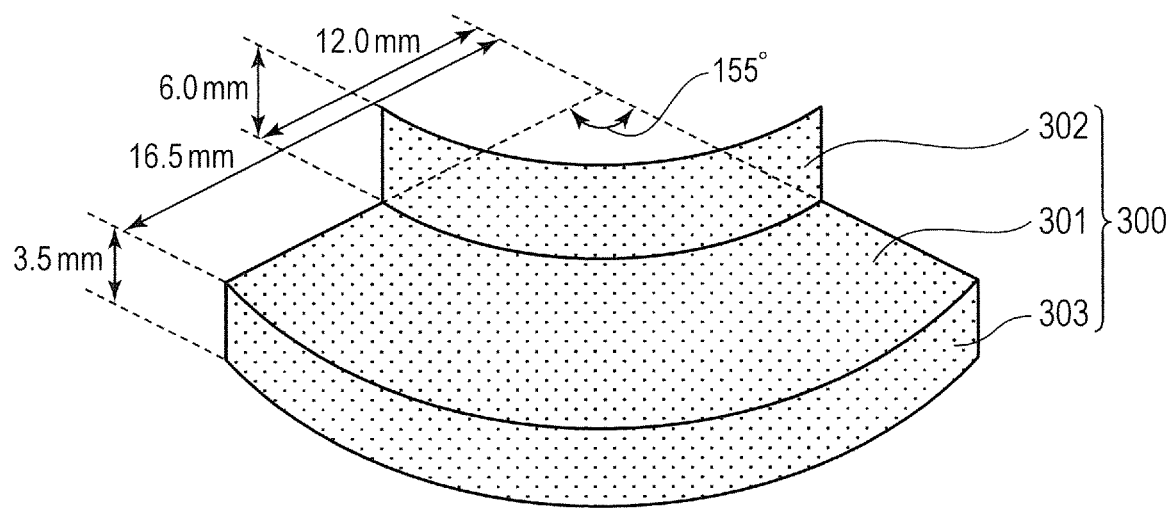
FIG. 9 is a schematic view showing the conductive member used in Example 1 in the comparative examination of the image shake correction mechanism according to the first embodiment.

FIG. 9 is a schematic view showing the conductive member 300 used for Example 1 in the comparative examination of the image shake correction mechanism 200 according to the first embodiment. The conductive member 300 is made of a copper plate having a thickness of 0.3 [mm]. The distance between the coils 231 and 232 and the facing surface 301 of the conductive member 300 was set to 2.25 [mm]. The flexible printed board 203 connected to the coils 231 and 232, and the support 207 are positioned between the coils 231 and 232 and the conductive member 300.

As shown in FIG. 4A above, the conductive member 300 has the facing surface 301 for covering up to the outer peripheries of the coils 231 and 232, and has the bent portions 302 and 303, and then the facing surface 301 and the bent portions 302 and 303 are formed along the support 207. As shown in FIG. 9, the facing surface 301 has a shape formed by removing a sector having a radius of 12.0 [mm] and a center angle of 155° from a sector having a radius of 16.5 [mm] and a center angle of 155°. The bent portion 302 is provided along the shorter curve of the two curves of the facing surface 301 with a length of 6.0 [mm] in a direction away from the coils 231 and 232. The bent portion 303 is provided along the longer curve of the two curves of the facing surface 301 with a length of 3.5 [mm] in a direction toward the coils 231 and 232.

The digital single-lens camera shown in FIG. 7 was held in the normal position with no tilt, and the examination was carried out without any external shaking or the like. A pulse current of about 55 [kHz] was input into the coils 231 and 232 from the flexible printed board 203. For Example 1, actual measurement was carried out by using the configuration of the conductive member 300 shown in FIG. 9. On the other hand, for Comparative Example 1, the measurement was carried out by the configuration in which the bent portions 302 and 303 of the conductive member 300 were removed from the configuration shown in FIG. 9.

Figure 10:
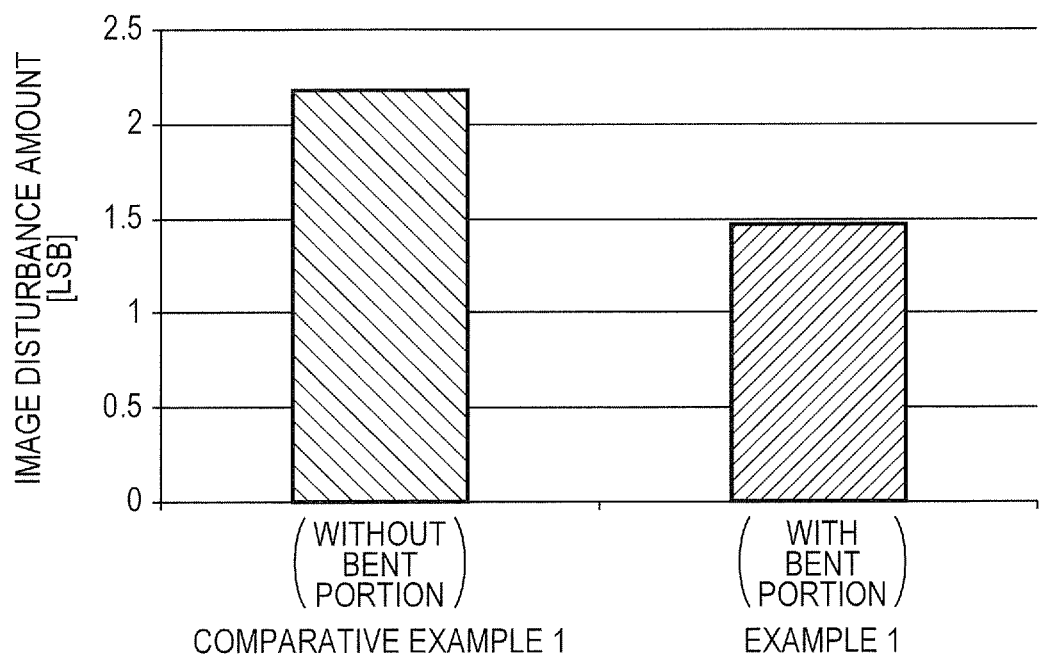
FIG. 10 is a diagram showing results of actual measurement according to Example 1 and Comparative Example in the comparative examination of the image shake correction mechanism according to the first embodiment.

FIG. 10 is a diagram showing the results of the measurements according to Example 1 and Comparative Example in the comparative examination of the image shake correction mechanism 200 according to the first embodiment. The horizontal axis of the graph shown in FIG. 10 indicates whether the measurement object is Example 1 or Comparative Example 1, and the vertical axis shows the image disturbance amount [LSB] generated in the dark image by the magnetic field.

As shown in FIG. 10, in Comparative Example 1 having no bent portions 302 and 303, the image noise level was about 2.19 [LSB]. On the other hand, in Example 1 having the bent portions 302 and 303, the image noise level is about 1.47 [LSB], and the image noise level is reduced by about 33% as compared with Comparative Example 1. In other words, it was confirmed that the magnetic noise generated by the coils 231 and 232 of the image shake correction mechanism 200 was reduced by providing the bent portions 302 and 303 on the conductive member 300.

Example 2

Figure 11A:
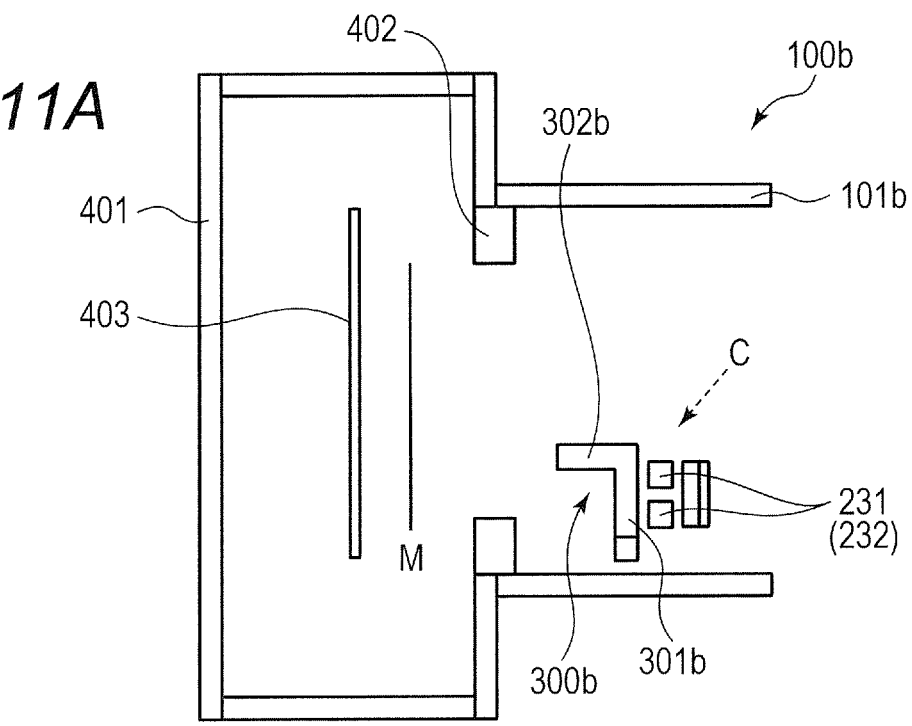
FIGS. 11A and 11B are schematic views showing an imaging device used in Example 2 in the comparative examination of the image shake correction mechanism according to the first embodiment.
Figure 11B:
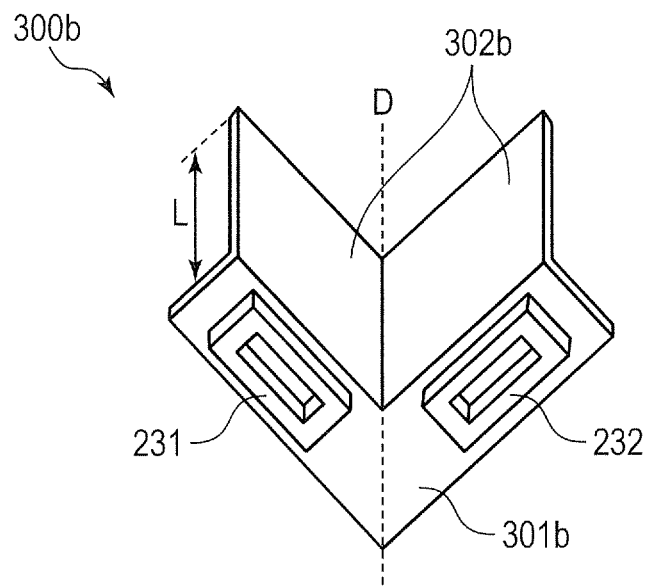

Next, in order to confirm the influence of the length L of the bent portion 302 provided on the conductive member 300 on reduction of the magnetic noise, the length L of the bent portion 302 was changed and a comparative examination was made by simulation. FIGS. 11A and 11B are schematic views showing the imaging device used in Example 2 in the comparative examination of the image shake correction mechanism 200 according to the first embodiment. FIG. 11A is a cross-sectional view of the simulation model of the imaging device used in Example 2, and FIG. 11B is a perspective view of a conductive member 300b shown in FIG. 11A when viewed in the direction C.

In Example 2, the length L of a bent portion 302b of the conductive member 300b was varied to compare the magnetic field levels reaching the imaging element, so that the effect of the length L of the bent portion 302b on the reduction of the magnetic noise was examined. The magnetic field simulation for an imaging lens 100b according to Example 2 was performed using a commercially available electromagnetic field simulation ("Maxwell 3D" manufactured by ANSYS).

First, the simulation model with which the magnetic field simulation was conducted is described with reference to FIGS. 11A and 11B. The imaging lens 100b is composed of a lens outer casing 101b, the coils 231 and 232, and the nonmagnetic conductive member 300b. Each of the coils 231 and 232 is composed of a reel of copper wire. The coils 231 and 232 and the magnet units 210 and 220 were configured to have the same inner diameter, outer diameter, and thickness as those of the coils 231 and 232 and the magnet units 210 and 220 used in Example 1. The coils 231 and 232 are arranged at a distance of 12.1 [mm] from the central axis of the imaging lens 100b so that the winding axes of the coils 231 and 232 are parallel to the central axis.

The nonmagnetic conductive member 300b facing the coils 231 and 232 is made of copper. As shown in FIG. 11B, a facing surface 301b of the conductive member 300b faces the coils 231 and 232 and is formed in an L-shaped structure having a symmetrical structure with respect to an axis D parallel to the central axis of the imaging lens 100b. As shown in FIG. 11A, the bent portion 302b is bent in the direction toward an observation plane M to be described later along the long sides of the coils 231 and 232 and at the edge of the facing surface 301b, closer to the central axis of the imaging lens 100b. The thickness of the facing surface 301b and the bent portion 302b was set to 0.3 [mm].

The lens outer casing 101b was a cylindrical conductor made of aluminum having a thickness of 1.14 [mm], a length of 56.6 [mm] and an inner diameter of 58.1 [mm]. The lens outer casing 101b is connected to a camera outer casing 401 via a mount section 402. The mount section 402 was a cylindrical conductor composed of SUS304 having a thickness of 9 [mm], a length of 4.2 [mm], and an inner diameter of 40 [mm]. The camera outer casing 401 had a rectangular parallelepiped shape with a height of 65 [mm], a width of 105 [mm], a depth of 25 [mm] and a thickness of [mm]. The camera outer casing 401 was provided with an opening having a diameter of 58 [mm] to which the mount section 402 of the lens outer casing 101b was connected so that the central axis of the opening of the camera outer casing 401 coincided with the central axis of the mount section 402.

In the camera outer casing 401, the observation plane M for observing the magnetic field reaching the position where the imaging element should be disposed was provided, and a GND conductor pattern 403 corresponding to a pattern of a board located on the back surface of the imaging element was provided. The observation plane M had a height of 16 [mm] and a width of 24 [mm] as for its area and was arranged at a distance of 24.4 [mm] from the coils 231 and 232 in the direction parallel to the central axis of the imaging lens 100b. Also, the center point of the observation plane M was positioned on the central axis of the imaging lens 100b. The GND conductor pattern 403 had a height of 26.7 [mm], a width of 36.55 [mm] and a thickness of 0.035 [mm] and arranged at a distance of 3.12 [mm] from the observation plane M in the direction parallel to the central axis of the imaging lens 100b.

Figure 12:
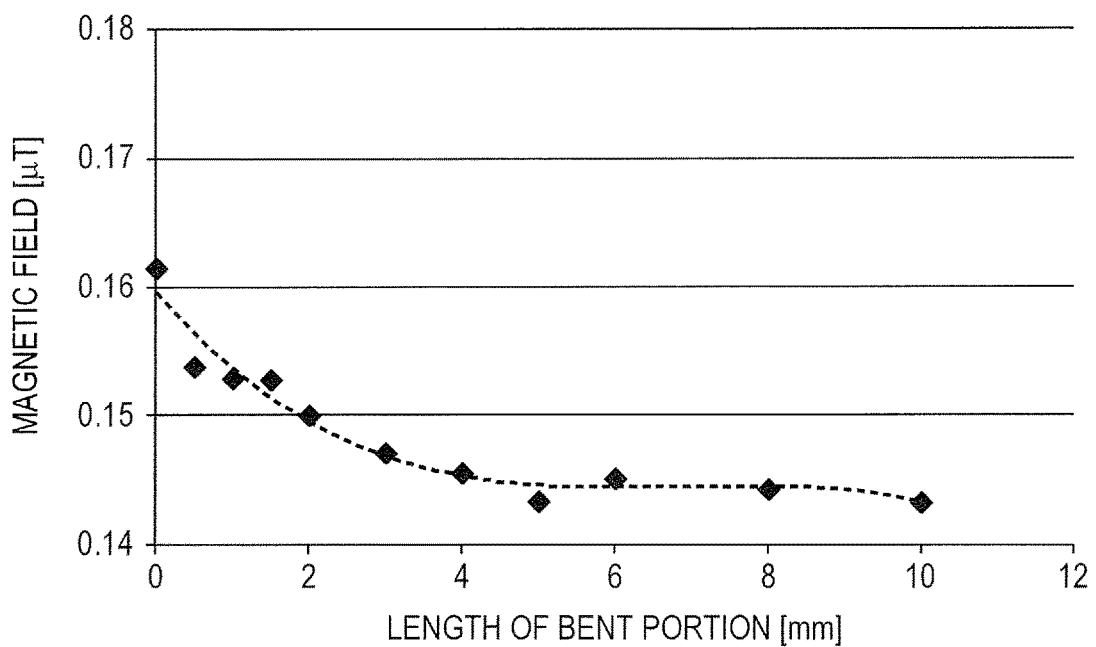
FIG. 12 is a diagram showing a simulation result of the influence of the length of a bent portion on the reduction of magnetic noise in the image shake correction mechanism according to the first embodiment.

In order to carry out the magnetic field simulation, currents of approximately 55 [kHz] and 1 [A] in the same phase were applied to the coils 231 and 232, and the average value of the magnetic field reaching the observation plane M was obtained. FIG. 12 is a diagram showing the simulation result of the influence of the length of the bent portion 302b on the reduction of the magnetic noise in the image shake correction mechanism 200 according to the first embodiment. The horizontal axis of the graph shown in FIG. 12 indicates the length L [mm] of the bent portion 302b, and the vertical axis indicates the average magnetic field [μT] that has reached the observation plane M.

According to the result shown in FIG. 12, it can be seen that as the length L of the bent portion 302b from the edge of the facing surface 301b is larger, the magnetic field reaching the observation plane M corresponding to the position where the imaging element is disposed becomes less. In other words, it was confirmed that the magnetic noise generated by the coils 231 and 232 of the image shake correction mechanism 200 can be further reduced by increasing the length L of the bent portion 302b. In particular, it is understood that the effect of increasing the length of the bent portion 302b is remarkable in the range where the length L of the bent portion 302b is 2.4 [mm] or less, which is the minimum radius of the outer peripheries of the coils 231 and 232. That is, it was confirmed that by setting the length L of the bent portion 302b to 2.4 [mm] or more, which is the minimum radius of the outer peripheries of the coils 231 and 232, the magnetic noise generated by the coils 231 and 232 of the image shake correction mechanism 200 can be reduced while the length L is suppressed.

As described above, the image shake correction device according to the present embodiment has a nonmagnetic conductive member that is arranged between the coil and the imaging element, that is, between the coil and the mount section, and has a facing surface facing the surface formed by the winding wire of the coil and having a larger area than the surface formed by the inner periphery of coil. The conductive member has a bent portion outside the position opposed to the inner periphery of the coil. With such a configuration, an imaging lens and an imaging device that can reduce the magnetic noise generated by the coil, having a simple configuration can be provided.

Second Embodiment

Figure 13:
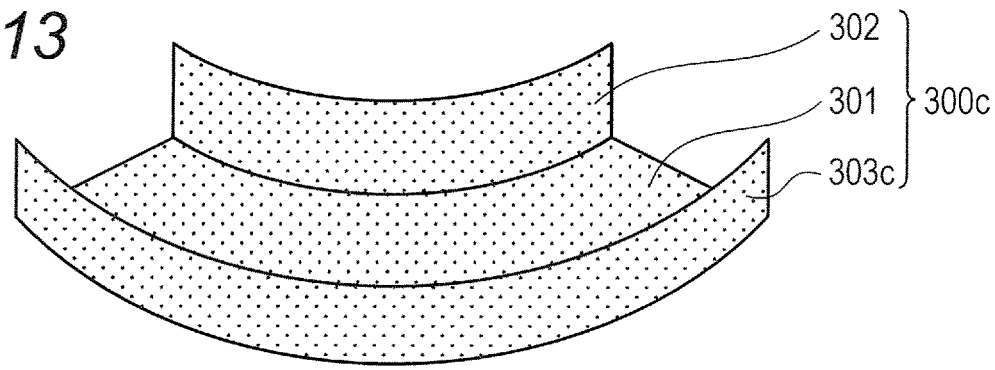
FIG. 13 is a schematic view showing a configuration of a conductive member in an image shake correction device according to a second embodiment.

Next, an image shake correction device according to a second embodiment of the present invention will be described with reference to FIG. 13. FIG. 13 is a schematic view showing the configuration of a conductive member 300c in the image shake correction device according to the second embodiment. Incidentally, in this embodiment, the same components as those in the first embodiment are denoted by the same reference numerals and the description thereof is omitted.

The image shake correction device of the present embodiment has a configuration in which the conductive member 300c shown in FIG. 13 is provided instead of the conductive member 300 of the first embodiment. The other configurations are the same as those in the first embodiment, so that the description is omitted. As shown in FIG. 13, a bent portion 303c of the conductive member 300c of the present embodiment is bent in a direction away from the coils 231 and 232. That is to say, the bending direction of the bent portion 303c of the present embodiment is opposite to the bending direction of the bent portion 303 of the first embodiment, and the two bent portions 302 and 303c are bent in the same direction. Alternatively, the bending direction of the bent portion 302 in the first embodiment may be changed to be opposite, and the two bent portions 302 and 303c may be bent in a direction toward the coils 231 and 232. The conductive member 300c of the present embodiment shown in FIG. 13 may have a larger number of bent portions in accordance with the shapes of the coils 231 and 232 or the shape of the facing surface 301. For example, bent portions bent in the direction toward the coils 231 and 232 may be provided on the four sides of the facing surface 301 so as to surround the entire circumference of the area where the coils 231 and 232 are provided.

As described above, in the image shake correction device of the present embodiment, the plurality of bent portions of the conductive member are bent in the same direction. With such a configuration, it is possible to save space and miniaturize the product.

Third Embodiment

Figure 14:
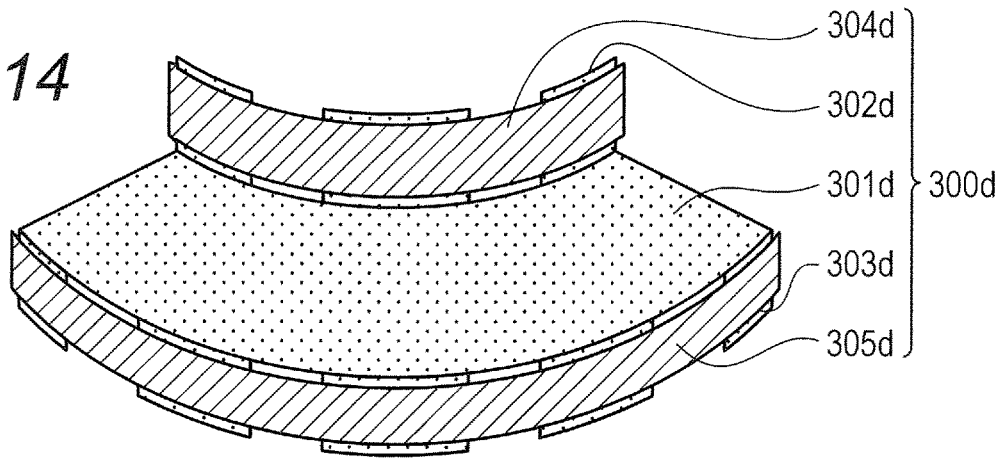
FIG. 14 is a schematic view showing a configuration of a conductive member in an image shake correction device according to a third embodiment.

Next, an image shake correction device according to a third embodiment of the present invention will be described with reference to FIG. 14. FIG. 14 is a schematic view showing the configuration of a conductive member 300d in the image shake correction device according to the third embodiment. In the present embodiment, the same components as those in the first embodiment are denoted by the same reference numerals and the description thereof is omitted.

The image shake correction device of the present embodiment is configured to have the conductive member 300d shown in FIG. 14 instead of the conductive member 300 of the first embodiment. The other configurations are the same as those in the first embodiment, so that the description is omitted. As shown in FIG. 14, the conductive member 300d of the present embodiment has a plurality of cutouts in bent portions 302d and 303d. And the conductive member 300d further has nonmagnetic conductive members 304d and 305d connected to the bent portions 302d and 303d at two or more positions.

The conductive member 304d is a rectangular conductor having a width corresponding to the length of the bent portion 302d in the bending direction and a length corresponding to the circumference of the edge on the lens 111 side of a facing surface 301d. The conductive member 305d is a rectangular conductor having a width corresponding to the length of the bent portion 303d in the bending direction and a length corresponding to the circumference of the edge on the opposite side of the facing surface 301d from the lens 111.

The conductive member 304d is bent along the periphery on the lens 111 side of the facing surface 301d and connected to the bent portion 302d provided with the cutouts, at a plurality of positions. The conductive member 305d is bent along the periphery on the opposite side of the facing surface 301d from the lens 111 and connected to the bent portion 303d provided with cutouts, at a plurality of positions. The method for connecting the bent portions 302d and 303d and the conductive members 304d and 305d may be, for example, a method using a screw, or a conductive adhesive or a pressing method using other members.

As described above, the bent portion of the present embodiment has connecting portions having cutouts (bent portions 302d and 303d). And the bent portion has a second conductive member (conductive members 304d and 305d) connected to the connecting portions at a plurality of positions. With such a configuration, the eddy current flowing due to the interlinking of the magnetic field with the facing surface flows also through the second conductive member, and thereby an imaging lens and an imaging device capable of reducing the magnetic noise generated by the coil can be provided.

In addition, in the present embodiment, the surface where the bent portions 302d and 303d and the conductive members 304d and 305d are connected increases in the thickness of the conductor, so that the structure has a lower resistance value and the eddy current can flow more easily. Therefore, according to the present embodiment, even when cutouts are formed in the bent portions 302d and 303d, the magnetic field reaching the imaging element can be reduced. Moreover since the cutouts are provided, the bent portions 302d and 303d can be formed by bending directly without using a die or the like with regard to the creation of the bent portions 302d and 303d along the curved surface of the facing surface 301d.

Incidentally, as more eddy currents flow through the bent portions 302d and 303d and the conductive members 304d and 305d, more magnetic field reduction effect is created. According to the above example, the connection between the bent portions 302d and 303d and the conductive members 304d and 305d is made at a plurality of positions, and the bent portions and the conductive members preferably have further more connecting positions.

Fourth Embodiment

Next, an image shake correction device according to a fourth embodiment of the present invention will be described. In the present embodiment, the same components as those in the first embodiment are denoted by the same reference numerals and the description thereof is omitted.

In the image shake correction device of the present embodiment, the thickness of the facing surface 301 of the conductive member 300 is made thinner than the thickness of the edges of the facing surface 301 where the bent portions 302 and 303 are to be provided. Such a conductive member 300 can be manufactured by applying press work to the conductive member 300 of the above-described embodiment except the edges thereof. For example, when the conductive member 300 is thinned by press work or the like, only the edges of the conductive member 300 are not subjected to press work, so as to keep thickness to the edges to secure edges equivalent to the bent portions 302 and 303 described above. Incidentally, the thick edges created by not performing the press work or the like can be regarded as the bent portions 302 and 303 as they are, or the thick edges of the facing surface 301 may be further provided with the bent portions 302 and 303.

As described above, in the image shake correction device of the present embodiment, the conductive member undergoes press work, and the thickness of the conductive member is thinned leaving the edges as they are. Therefore, a manufacturing method of an image shake correction device which can reduce the magnetic noise generated by the coil can be provided, because the bent portion including the edge of the facing surface has a structure in which more eddy current can easily flow.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-241955, filed Dec. 14, 2016 which is hereby incorporated by reference herein in its entirety.

What is claimed is:

1. An optical apparatus comprising:
   an imaging optical system including a plurality of lenses;
   a movable member that holds at least one lens of the plurality of lenses and that is movable in a direction intersecting with an optical axis of the imaging optical system;
   a stationary member that supports the movable member with a restriction of movement in the direction intersecting with the optical axis of the imaging optical system;
   a permanent magnet provided on one of the movable member and the stationary member;
   a coil provided on the other of the movable member and the stationary member, the coil being arranged facing the permanent magnet;
   a mount section that is attachable to a body provided with an imaging element; and
   a conductive member arranged between the coil and the mount section and including a first surface facing the coil,
   wherein the first surface of the conductive member overlaps with at least a part of the coil in a planar view from the mount section in a direction of the optical axis,
   wherein the conductive member includes a second surface slanted with respect to the first surface wherein the second surface of the conductive member is provided at an edge of the first surface, and
   wherein the second surface of the conductive member is provided at an edge of the first surface.

2. The optical apparatus according to claim 1, wherein the conductive member is nonmagnetic.

3. The optical apparatus according to claim 1, wherein an area of the first surface of the conductive member is equal to or more than an area of a surface of the coil facing the conductive member.

4. The optical apparatus according to claim 1, wherein the second surface of the conductive member is slanted in a direction away from the coil.

5. The optical apparatus according to claim 1, wherein a distance between the first surface and the coil is shorter than the longest distance from a center of the coil to an outer periphery of the coil in a planar view of the coil from the first surface of the conductive member.

6. The optical apparatus according to claim 1, wherein a length of the second surface of the conductive member in a direction slanted with respect to the first surface is longer than the shortest distance from a center of the coil to an outer periphery of the coil in a planar view of the coil from the first surface of the conductive member.

7. The optical apparatus according to claim 1, wherein the first surface and the second surface are formed of different members from each other in the conductive member, and
   wherein the conductive member includes a connecting portion connecting the first surface and the second surface.

8. The optical apparatus according to claim 1, wherein the coil includes a winding wire.

9. The optical apparatus according to claim 1, wherein the optical apparatus further includes a drive circuit, and wherein the drive circuit applies a current to the coil to relatively move the movable member with respect to the stationary member.

10. The optical apparatus according to claim 1, wherein a plurality of the coils and a plurality of the permanent magnets are provided, and
wherein the plurality of the coils are arranged at positions with equal distances from a center of the lens held by the movable member.

11. The optical apparatus according to claim 1, wherein the second surface does not overlap with the coil in a planar view from the mount section in a direction of the optical axis.

12. The optical apparatus according to claim 1, wherein the first surface of the conductive member overlaps with at least a part of the permanent magnet in a planar view from the mount section in a direction of the optical axis.

13. An imaging device comprising:
a body provided with an imaging element; and
an optical apparatus connected to the body,
wherein the optical apparatus comprises:
(1) an imaging optical system including a plurality of lenses;
(2) a movable member that holds at least one lens of the plurality of lenses and that is movable in a direction intersecting with an optical axis of the imaging optical system;
(3) a stationary member that supports the movable member with a restriction of movement in the direction intersecting with the optical axis of the imaging optical system;
(4) a permanent magnet provided on one of the movable member and the stationary member;
(5) a coil provided on the other of the movable member and the stationary member, the coil being arranged facing the permanent magnet;
(6) a mount section that is detachable from the body; and
(7) a conductive member arranged between the coil and the mount section and including a first surface facing the coil,
wherein the first surface of the conductive member overlaps with at least a part of the coil in a planar view from the mount section in a direction of the optical axis,
wherein the conductive member includes a second surface slanted with respect to the first surface, and
wherein the second surface of the conductive member is provided at an edge of the first surface.

* * * * *